United States Patent [19]
Burke

[11] 4,285,485
[45] Aug. 25, 1981

[54] RETRACTABLE SONAR SENSING SYSTEM

[76] Inventor: Willard E. Burke, 416 W. Douglas Ave., Fergus Falls, Minn. 56537

[21] Appl. No.: 59,562

[22] Filed: Jul. 23, 1979

[51] Int. Cl.³ .............................................. E04G 3/00
[52] U.S. Cl. ................................... 248/291; 248/642
[58] Field of Search ............... 248/291, 293, 640, 641, 248/642, 643, 226.4; 367/173; 115/17; 9/1.7, 1.4

[56] References Cited

U.S. PATENT DOCUMENTS

| | | | |
|---|---|---|---|
| 2,424,222 | 7/1947 | Brown et al. | 248/278 |
| 2,461,356 | 2/1949 | Sus et al. | 248/291 |
| 3,424,412 | 1/1969 | Gayle | 248/642 |
| 3,734,439 | 5/1973 | Wintz | 248/291 X |
| 3,740,706 | 6/1973 | Joseph | 367/173 |

FOREIGN PATENT DOCUMENTS 701211 1/1941 Fed. Rep. of Germany ........... 248/291
833982 3/1952 Fed. Rep. of Germany ........... 248/291

*Primary Examiner*—J. Franklin Foss
*Attorney, Agent, or Firm*—Schroeder, Siegfried, Ryan, Vidas, Steffey & Arrett

[57] ABSTRACT

A readily retractable sonar sensor system having a sensor carried by a rod slidably mounted in a sleeve which is located in spaced relation to the axis of rotation of a disc upon which the sleeve is fixedly supported, the latter extending normally to the radius of the disc. The disc is pivotally mounted on a plate which is supported by a C-clamp connected to its peripheral portion and mounted on a boat transom. Spring means surrounding the pivot pin urges the disc and plate together, causing matching projections on the disc to extend into openings in the plate to releasably control relative rotation therebetween, so that when the rod is swung to generally horizontal orientation, the sensor swings rearwardly and upwardly out of the water.

10 Claims, 5 Drawing Figures

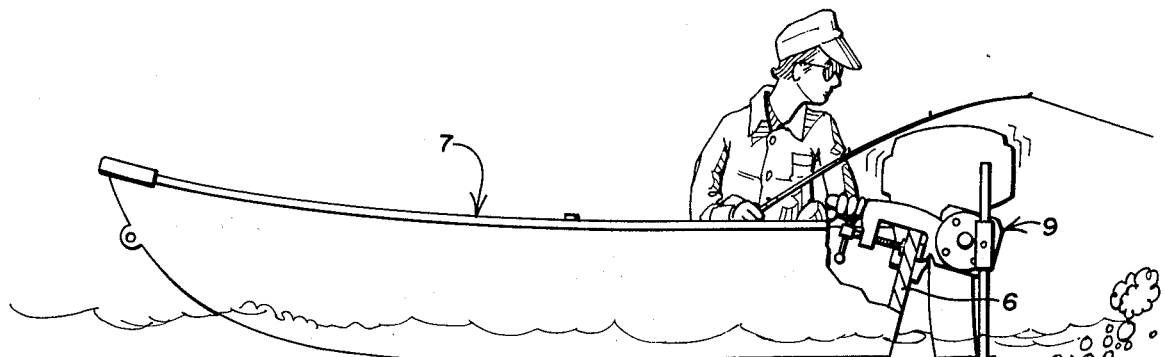
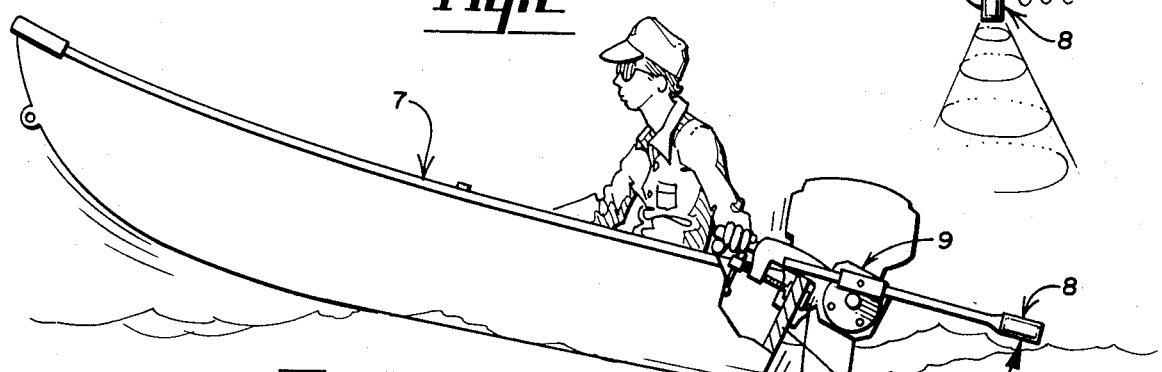
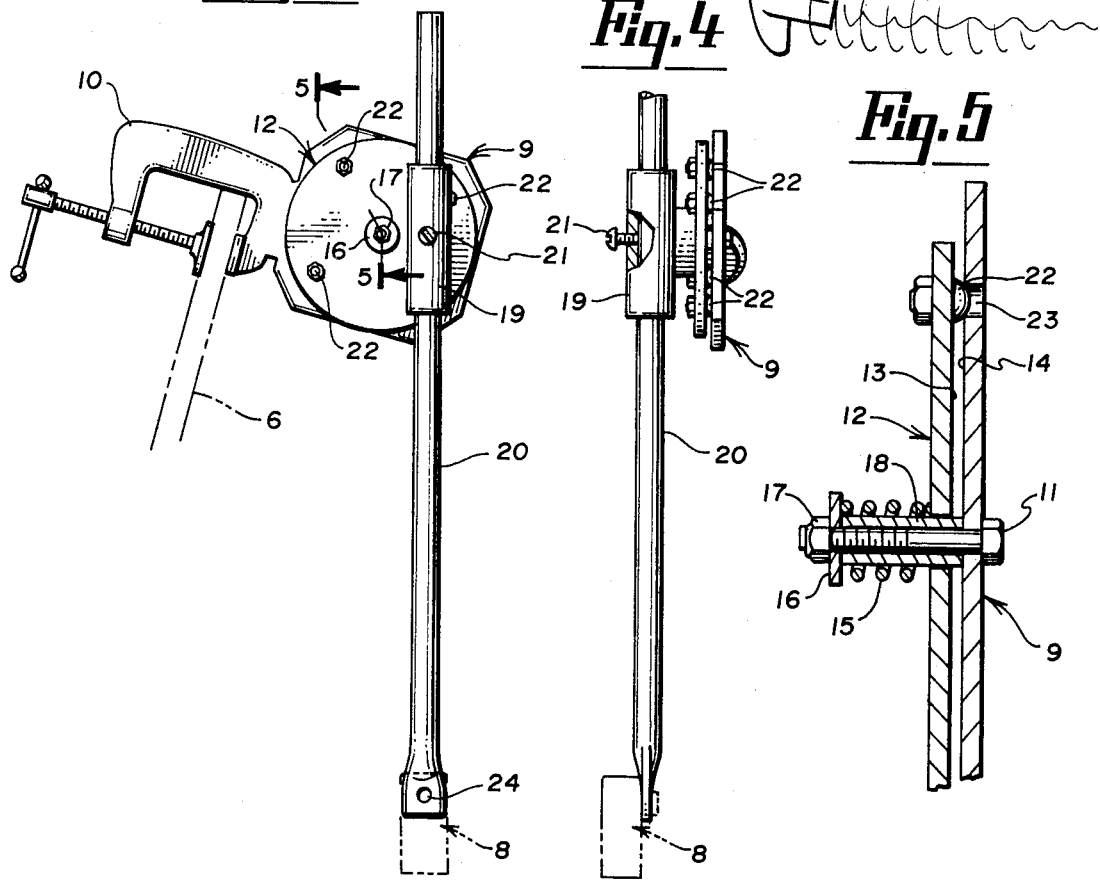

RETRACTABLE SONAR SENSING SYSTEM

It is a general object of my invention to provide a novel and improved mounting for a sonar sensor on the transom of a boat which is simple and inexpensive to manufacture and utilize.

Another object is to provide a novel mounting for a sonar sensor which will suspend the sensor along a vertical line while the boat is being propelled slowly for trolling and will permit swinging of the sensor to a position out of the water and hold it thereat while the boat is being propelled rapidly.

A further object is to provide a readily retractable novel mounting for a sonar sensor upon a transom of a boat which is simple and inexpensive, is readily accessible to the operator of the boat, will permit the sensor to be swung to an out-of-water position, and is readily adjustable to various depths.

These and other objects and advantages of my invention will more fully appear from the following description, made in connection with the accompanying drawings, wherein like reference characters refer to the same or similar parts throughout the several views, in which:

FIG. 1 is a diagrammatic side elevational view of a boat, a propelling motor and one of my readily retractable sonar sensor systems secured thereto, the boat being propelled slowly by the motor for trolling;

FIG. 2 is a diagrammatic side elevational view of a similar boat with the sonar sensor swung to an elevated, rearwardly extending position out of the water while the boat is being propelled rapidly through the water;

FIG. 3 is a side elevational view on an enlarged scale of my sonar sensor mounting;

FIG. 4 is a rear elevational view of the same, on the same scale as that shown in FIG. 3; and FIG. 5 is a fragmentary vertical sectional view on a further enlarged scale, taken along lines 5—5 of FIG. 3.

As shown in FIGS. 1-2, my retractable sonar sensing system is constructed and arranged to be clamped upon the transom 6 of a conventional fishing boat 7. As will be seen by reference to FIGS. 1-2, the transom of a fishing boat conventionally extends upwardly and slightly rearwardly relative to the general plane of the boat so that when the fishing boat is in a truly horizontal position, the transom extends slightly off vertical and upwardly and rearwardly relative to the bottom of the boat. As a consequence, during trolling operations, which causes the fishing boat 7 to have its forward end slightly elevated, a sonar sensor mounting which extends parallel to the transom will not be located at the maximum vertical depth. Consequently, I have designed my sensor mounting in such a manner that despite the angle of the fishing boat, the sensor indicated by the numeral 8 will be positioned along a truly vertical line despite the angulation of the boat and the angulation of the transom 6.

As best shown in FIGS. 3-5, my retractable sonar sensor mounting includes a generally rectangularly shaped support plate member 9 which has a C-clamp 10 welded to its peripheral edge portion, as at 11, and extending forwardly therefrom. As best shown in FIGS. 1-2, the C-clamp 10 is designed to engage the transom 6 and extend rearwardly therefrom along a line extending normal to the transom.

Fixedly mounted upon the support plate 9 and extending laterally outwardly therefrom at its center is a pivot pin 11. A disc member 12 is pivotally mounted on the pivot pin 11 and has a face 13 in juxtaposition with a corresponding face 14 of the support plate. A spring member 15 of predetermined strength and length is carried by the pivot pin 11 and is secured thereupon under predetermined tension with a washer 16 and threaded nut 17, as best shown in FIG. 5. A sleeve 18 of predetermined length surrounds the pivot pin 15 and extends through the disc 12 and abuts the washer 16 at one of its ends and the support plate 9 at its other end.

A sleeve member 19 is fixedly mounted on the face of the disc 12 opposite that to face 13 and is positioned so as to extend normal to a radius of the disc 12 at a location spaced a substantial distance from the axis of the sleeve 18. A rod or shaft 20 is slidably mounted within the sleeve 19 and is held in fixed position relative thereto by a set screw 21. Thus, the disc 12 and the support rod 20 can be swung around the axis of the pivot pin 11.

Cooperative catch means in the form of projections or pins 22 and openings 23 are provided on the disc member 12 and the plate member 9, respectively. As shown, the openings 23 are located a substantial distance radially outwardly from the sleeve 18 and each is equidistant therefrom. The projections or pins 22 which extend inwardly toward the plate 9 from the face 13 of the disc 12 are likewise secured to the disc 12 equidistantly from the sleeve 18 and at a distance such that they will extend into the openings 23. Moreover, they are each positioned equidistantly in a circumferential pattern so that at any relative position of the disc 12 and plate 9 in which one of the pins 22 extends into an openings 23, each of the other pins 22 will extend into a corresponding opening 23 simultaneously. As shown, there are four openings and four pins and they are located in a circumferential pattern around sleeve 18 such that the rod 20 extends vertically in one position and extends substantially parallel with the plane of the boat when it is being operated at a relatively high speed, as shown in FIG. 2 in a second position.

As best shown in FIGS. 3-4, the lower end of the rod 20 is flattened and perforated, as at 24, to facilitate the connection of the sensor 8 thereto.

In use during the fishing operations, as for example when trolling, as shown in FIG. 1, the rod 20 is swung to a position such that it extends vertically as shown so that the sonar sensor is at maximum depth. When it is desired to move to another location and to travel at a higher speed so as to save time, the upper end of the rod 20 is grasped and pulled forwardly until the rod extends as shown at FIG. 2 and each pin 22 moves into the next opening 23 in a counterclockwise direction. In this position, the sensor 8 is maintained in an elevated position, as shown in FIG. 2. Upon arriving at the new location, it is a simple matter to merely swing the upper end of the rod 20 upwardly and rearwardly until the pins 22 enter the next opening in a clockwise direction whereat the sonar sensor 8 will be oriented and located, as shown in FIG. 1.

From the above, it will be seen that I have provided a very simple and inexpensive but highly effective mounting for a sonar sensor which can be quickly and easily attached to the transom of a boat and can be quickly and easily swung from an optimum operating position, as shown in FIG. 1, to an out-of-way and elevated position, as shown in FIG. 2, to thereby facilitate its use. Since some boats extend more deeply into the water than others, the transom height varies and, therefore, the extent to which the rod 20 extends downwardly through the sleeve 19, can be readily adjusted to compensate for that fact by loosening the set screw 21 and adjusting the rod to be the desired depth.

As indicated above, my releasable sonar sensor mounting is relatively simple and inexpensive to manufacture and utilize. It is readily retractable, readily accessible to the operator and is readily adjustable to various depths.

It will, of course, be understood that various changes may be made in the form, details, arrangement and proportions of the parts without departing from the scope of my invention which consists of the matter shown and described herein and set forth in the appended claims.

I claim:

1. A readily retractable sonar sensor system comprising:
   (a) a support plate member;
   (b) clamping means carrying said plate member and constructed and arranged to clamp the transom of a fishing boat and thereby support said plate member in rearwardly generally vertically extending position relative to such a transom;
   (c) a mounting disc member extending substantially parallel to and beside said plate member;
   (d) a pivot pin carried by said plate member rearwardly of said clamping means and of the boat and rotatably mounting said disc member thereon for rotation of said disc member about an axis located centrally of the latter and closely adjacent said clamping means;
   (e) spring bias means carried by said pivot pin and urging said members toward each other;
   (f) a sleeve fixedly mounted on said disc member laterally of said pivot pin and on the side of said disc member non-adjacent to said plate member and having its axis extending generally parallel to said disc member;
   (g) a sonar sensor support rod slidably mounted within said sleeve for longitudinal shifting thereof axially of said sleeve to permit vertical adjustment of said rod;
   (h) means for adjustably securing said support rod within said sleeve;
   (i) a sonar sensor mounted on the lower end of said support rod; and,
   (j) cooperative releasable catch means carried by said members and normally holding said disc member from rotating about said pivot pin while said sensor is held in depending position by said support rod, said plate and disc members being constructed and arranged to permit said sensor to be readily swung upwardly away from the boat about the axis of said pivot pin and held by said catch means in an elevated out-of-way position by pulling forwardly on the upper end portion of said support rod.

2. The structure defined in claim 1, wherein said catch means is so constructed and arranged that the axis of said sleeve and said rod, when the lower end of the latter is moved to latched depending position, extends at a somewhat obtuse angle relative to a horizontal plane extending normal to and forwardly from the boat transom to which said clamping means is secured.

3. The structure defined in claim 1 wherein said clamping means is comprised of a C-clamp connected to the peripheral edge portions of said plate member.

4. The structure defined in claim 1 wherein said catch means is comprised of a plurality of recesses formed in one of said members and arranged radially equidistantly around said pivot pin, and a plurality of projections carried by the other of said members and also arranged radially equidistantly around said pivot pin and positioned correspondingly therearound on each of said members and extending into said recesses to releasably hold said members against relative rotation.

5. The structure defined in claim 1 wherein said sleeve member extends substantially normally of a radius of said disc member and is located a substantial distance radially outwardly of said pivot pin.

6. A readily retractable sonar sensor mounting comprising:
   (a) a support plate member;
   (b) securing means carrying said plate member and constructed and arranged to be attached to the transom in rearward generally vertically extending position relative to such a transom;
   (c) a pivoted mounting member having a face extending substantially parallel to and beside said plate member;
   (d) pivot means mounting said mounting member on said plate member for rotation thereof about an axis located centrally of said face and rearwardly of said securing means;
   (e) spring bias means connected to at least one of said members and urging said members toward each other;
   (f) a sleeve fixedly mounted on said mounting member on a side thereof non-adjacent to said plate member and laterally of said axis of rotation of said mounting member;
   (g) a sonar sensor support shaft slidably mounted within said sleeve for longitudinal shifting thereof axially of said sleeve to permit vertical adjustment of said shaft;
   (h) means for adjustably securing said shaft within said sleeve;
   (i) said shaft having its lower end portion constructed and arranged to support a sonar sensor thereon within the water when disposed in depending position; and
   (j) releasable cooperative catch means carried by said members and normally holding said disc member from rotating about said pivot means while said sensor is held in depending position by said shaft, said plate member and said pivoted mounting member being constructed and arranged to permit said sensor to be readily swung upwardly and away from the boat about the axis of said pivot means and held by said catch means in an elevated out-of-way position, by pulling forwardly on the upper end position of said shaft.

7. The structure defined in claim 6, wherein said catch means is so constructed and arranged that the axis of said sleeve and said shaft, when the lower end of the latter is moved to depending position, extends at an obtuse angle relative to a generally horizontal plane extending normal to and forwardly from the boat transom to which said securing means may be secured.

8. The structure defined in claim 6 wherein said sleeve member extends substantially normal of a radius of said mounting member and is disposed a substantial distance radially outwardly of said pivot means.

9. The structure defined in claim 6, wherein said catch means is comprised of a plurality of openings formed in one of said members and arranged radially equidistantly around said pivot means, and a plurality of pins carried by the other of said members and arranged radially equidistantly around said pivot means and spaced circumferentially from each other distances equal to the circumferential spacing of said openings and extending into said openings when moved into juxtaposition by rotation of said mounting member relative to said plate member, to thereafter releasably hold said members against relative rotation at a number of positions.

10. The structure defined in claim 6, wherein said securing means is comprised of a C-clamp secured to the peripheral edge portions of said plate member.

* * * * *